March 6, 1962  C. J. COBERLY  3,024,094
REGENERATIVE FURNACE AND PROCESS OF OPERATING
Filed Sept. 24, 1956  3 Sheets-Sheet 1

CLARENCE J. COBERLY,
INVENTOR.
By His Attorneys
HARRIS, KIECH, FOSTER & HARRIS.

March 6, 1962 C. J. COBERLY 3,024,094
REGENERATIVE FURNACE AND PROCESS OF OPERATING
Filed Sept. 24, 1956 3 Sheets-Sheet 2
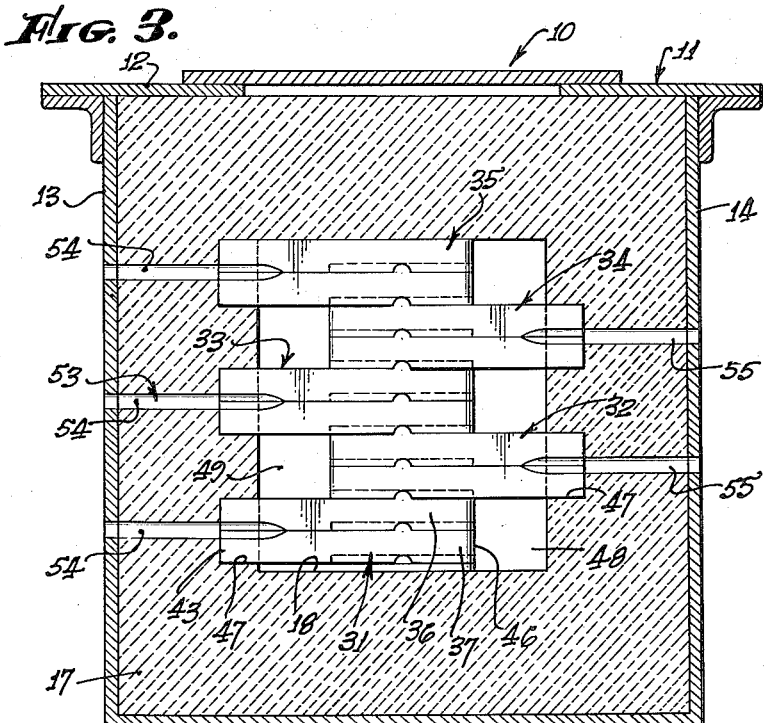
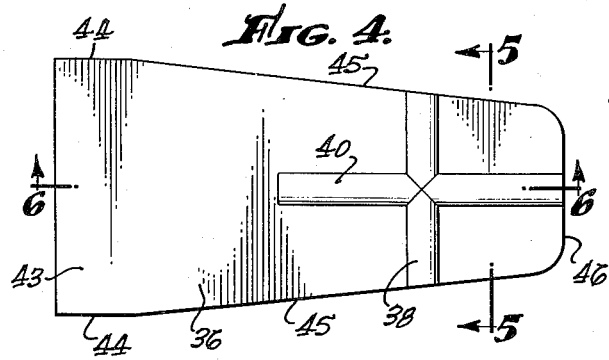
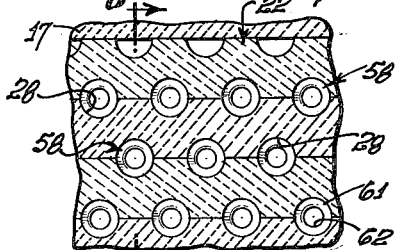
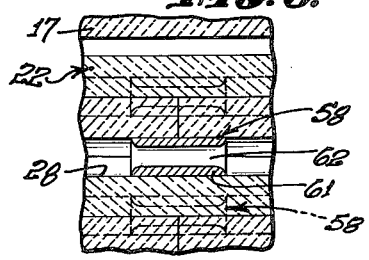
CLARENCE J. COBERLY,
INVENTOR.
By His Attorneys
HARRIS, KIECH, FOSTER & HARRIS.

United States Patent Office 3,024,094
Patented Mar. 6, 1962

3,024,094
REGENERATIVE FURNACE AND PROCESS OF OPERATING
Clarence J. Coberly, San Marino, Calif., assignor to Wulff Process Company, Huntington Park, Calif., a corporation of California
Filed Sept. 24, 1956, Ser. No. 611,494
7 Claims. (Cl. 23—277)

This application relates to a regenerative furnace and process of operating the same in the pyrolytic decomposition of hydrocarbons to form acetylene, ethylene, and other materials which require high temperatures and high energy transfer to supply the heat of formation.

In all interpretations of the accompanying specification and claims, the following definitions shall govern:

A "suitable hydrocarbon" is any hydrocarbon known to the art to be capable when pyrolyzed of forming acetylene, ethylene, or other unsaturated chemical compounds. Methane, ethane, propane, butane, gas oil or other petroleum fractions, and unsaturated hydrocarbons such as ethylene, butylene, and propylene, and gases such as natural gas or refinery gases are among the many hydrocarbons which fall within this definition.

An "in-gas" is a gas containing a suitable hydrocarbon which is delivered to the furnace and subjected to the process of the invention.

A "desired hydrocarbon" is acetylene, ethylene, or other unsaturated chemical compound, or a mixture thereof, formed by the pyrolysis of a suitable hydrocarbon in the furnace and by the process of this invention.

An "off-gas" or "cracked gas" is a gas formed in the furnace and by the process of this invention by the pyrolysis of an in-gas and caintaining a desired hydrocarbon.

"Sensible heat" is heat absorbed by a gas as it is heated and which is not utilized by any chemical reaction and which can be recovered from the gas as it cools.

"Reaction heat" is heat required to induce and promote a chemical reaction during pyrolysis of a suitable hydrocarbon.

In cracking hydrocarbons at high temperatures to form acetylene, ethylene, and other olefins, heat exchange from a cyclically heated ceramic mass is commonly employed. Such a process and apparatus are disclosed in the patent to R. L. Hasche et al. No., 2,692,819, and a commercial form of ceramic checkers for such a furnace is disclosed in the patent to Hasche, No. 2,622,864. In making acetylene from an in-gas such as a gas oil having a 2:1 hydrogen-carbon ratio, or when using ethylene as a feed stock, the theoretical maximum concentration of acetylene in the cracked gas, if there are no side reactions, would be about 50%. However, in using the apparatus and methods taught by the two above Hasche patents in actual commercial production for acetylene, the acetylene concentration in the cracked gas is only 12% to 14%. There are several reasons why such actual commercial yields of acetylene are so far below the theoretical maximum yield.

First, it is well known that to obtain a maximum acetylene yield, a high cracking temperature and a short time of contact of the feed stock with the hot ceramic mass (residence time) are required. When these conditions are met, the curve of yield plotted against temperature has a sharp peak, and at a given temperature the curve of contact time plotted against temperature also has a sharp peak. Heretofore, the commercial difficulty in the use of ceramic checker masses to provide the required heat and contact time has been a lack of adequate control over these factors. I have found, for example, that in using such masses optimum residence or contact time may vary one hundred fold with a temperature change of only 200° C to 300° C. Since the heat of reaction in a cyclic process using such ceramic masses must come from a reduction in the temperature of the mass, there is normally a considerable change in the temperature of the masses during the cycle. By making the cycle time short in an attempt to reduce such temperature change, I have found that the contamination of the ceramic masses with products of combustion increases, which in effect defeats the purpose of a reduction of cycle time.

Secondly, I have found that in the use of a ceramic mass such as disclosed in Hasche No. 2,622,864, which has a plurality of longitudinal passages therethrough, the conditions of flow and temperature of the in-gas flowing through the various passages during cracking differ substantially. This results in an acetylene concentration of as low as 8% in some passages and over 16% in others, with a wide variation in between.

It is, therefore, a primary object of this invention to provide a regenerative furnace of the general type referred to above, but in which the temperature and flow conditions in the passages through each of the ceramic masses are substantially uniform, with the result that the concentrations of the desired product, such as acetylene, in the gas from the passages will be approximately the same and will provide a higher maximum net yield of the desired hydrocarbon. I accomplish this by providing metering means in the passages of the ceramic mass to control the flow of gas therethrough so that such flow through all of the passages will be substantially uniform, thus insuring that the temperature and residence time of the gas in the mass will be nearer an optimum. Also contributing to this result are the relative proportions of the ceramic masses employed in my furnace.

A further object of the invention is to provide such a furnace and a process of operation by which a suitable feed stock, such as propane, is cracked in two separate steps to produce a high yield of acetylene. In this method of operation the feed stock is first cracked to a high yield of ethylene and a smaller yield of acetylene, at an intermediate cracking temperature, and then the cracked gas is subjected to a higher temperature for a very short period to convert a substantial portion of the ethylene therein to acetylene. I prefer to accomplish this by providing the first such cracking step in one ceramic mass and then immediately performing the second cracking step in a second mass, followed immediately by a quench of the final cracked gas.

A further object of the invention is to provide an optimum heat balance during the operation of the process. For best results, at least in the production of acetylene as the desired hydrocarbon, the major portion of the total of both sensible heat and reaction heat employed in the process is transferred to the in-gas in the first ceramic mass, only a minor portion of either being transferred to the gas in the center mass.

Also important in obtaining uniform temperatures in all of the passages of such a ceramic mass is the supply of a heating gas which has a uniform high temperature throughout and is uniformly fed to the masses to be heated, and this is a further object of my invention. I attain this objective by providing baffle means in each of the combustion chambers of the furnace, constructed so as to insure a uniform combustible mixture therein of fuel and air, and to provide a uniform flow and distribution of the hot products of combustion to the ceramic masses. Still another object of the invention is to provide such a combustion chamber in which the velocity of the gases therein is substantially constant and approximately equal to the velocity of gas through the masses.

Other objects and advantages will appear from the following specification and the drawings, which are for the purpose of illustration only, and in which:

FIG. 3 is a cross-sectional view taken on the line 3—3 of FIG. 1;

FIG. 4 is an enlarged plan view of one of the baffle members of the invention;

FIG. 5 is a sectional view taken on the line 5—5 of FIG. 4;

FIG. 6 is a sectional view taken on the line 6—6 of FIG. 4;

FIG. 7 is an enlarged fragmentary cross-sectional view taken on the line 7—7 of FIG. 1;

FIG. 8 is a longitudinal section taken on the line 8—8 of FIG. 7; and

Figure 1:
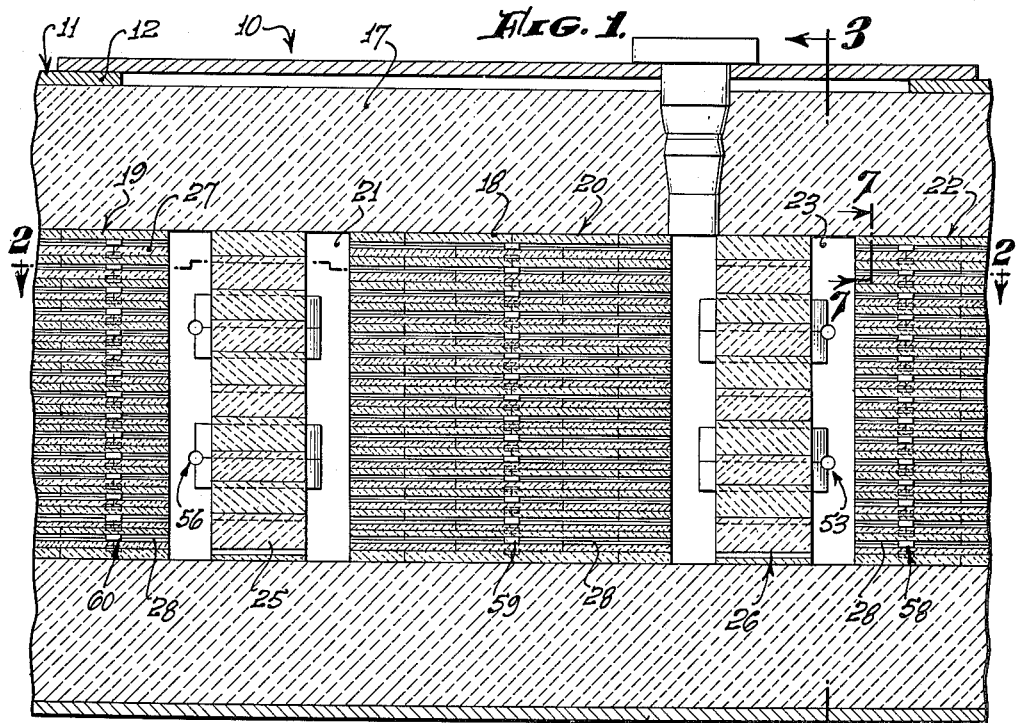
FIG. 1 is a longitudinal vertical section along the center line of my furnace.
Figure 2:
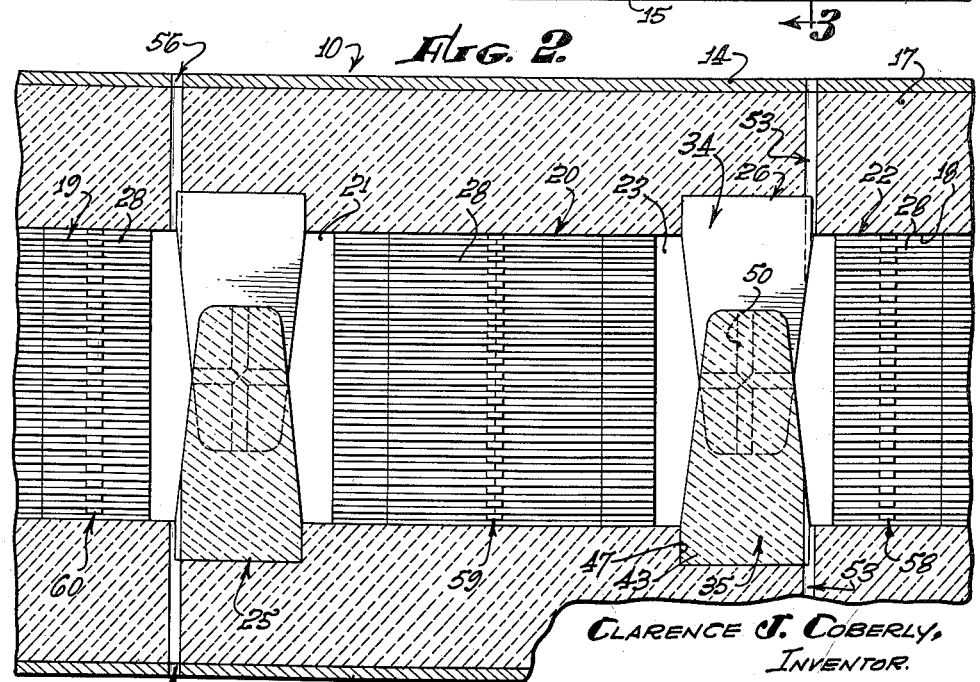
FIG. 2 is a horizontal section taken on the line 2—2 of FIG. 1.

Referring to FIGS. 1, 2, and 3 of the drawings, a regenerative furnace 10 has a metal shell 11 consisting of a top 12, sides 13 and 14, and a bottom 15. The shell 11 is lined with fire brick 17 to form a longitudinal rectangular channel 18 therethrough. Disposed in the channel 18 is a left-hand or "LH" ceramic mass 19, a ceramic center mass 20 spaced from the LH mass to provide a first combustion chamber 21, a right-hand or "RH" ceramic mass 22 separated from the center mass to provide a second combustion chamber 23. Located in the first combustion chamber 21 is a first baffle means 25 and located in the second combustion chamber 23 is a second baffle means 26 identical with the first baffle means 25.

The masses 19, 20, and 22 may be formed of ceramic checkers 27 as shown in Hasche Patent No. 2,622,864, the checkers having semi-circular grooves in their faces so arranged that when the checkers are stacked as shown they will form in the masses longitudinal tubular holes or passages 28, best illustrated in FIGS. 2, 7, and 8. For a furnace capable of producing one million pounds per year of acetylene each of the masses 19, 20, and 22 has a cross-section of 18" x 20" containing about 744 of the passages 28. In the embodiment shown and for a furnace of such capacity, the LH and RH masses 19 and 22 are 81" in length, the center mass 20 has a length of 22¼", and the combustion spaces 21 and 23 are each 11½" long.

The second baffle means 26 located in the second combustion chamber 23 includes a plurality of baffle elements 31, 32, 33, 34, and 35. As best shown in FIG. 3, each of the baffle elements 31–35 consists of two identical interlocking ceramic tile members 36 and 37, the details of the tile member 36 being best shown in FIGS. 4, 5, and 6. Each tile member 36 has a raised transverse bead 38 which extends ⅜" above the upper surface and has a ½" radius, and has a transverse groove 39 in its bottom surface with a radius of 17/32". The tile member 36 also has a similar longitudinal bead 40 in its top surface and a similar longitudinal groove 41 in its bottom surface. The tile member 36 has a base 43 with parallel sides 44 and angled sides 45 which taper to an end 46. In the preferred embodiment described, the tile member 36 has a length of 16", and a thickness of 2", without including the height of the beads 38 and 40, the base 43 has a width of 8" and a length of 2½", and the small end 46 of the tile member has a width of 5" without allowing for the small radius on each of its corners.

As shown in FIG. 3, the tile members 36 and 37 are superimposed to form the baffle element 31, the grooves in the lower surface of the tile member 36 fitting over and interlocking with the beads on the upper surface of the tile member 37. As shown in FIGS. 2 and 3, the base 43 of the baffle element 31 extends into a suitable slot 47 in the fire brick lining 17, which prevents longitudinal displacement of the baffle element, leaving a space 48 between the end 46 of the baffle element and the other inner wall of the fire brick lining. The baffle element 32 is similarly installed but reversed in direction to provide a space 49 between the end of that baffle element and the other wall of the lining. The grooves of the lower tile of the baffle element 32 mate with the beads on the upper tile of the baffle element 31, as indicated by the dotted lines 50 of FIG. 2, to rigidly interlock the baffle elements together. The other baffle elements 33, 34, and 35 are similarly stacked on the baffle element 32, alternating in direction, as shown in FIG. 3. The tile elements are so designed that their transverse beads and grooves fall on the longitudinal center line of the furnace, as shown in FIG. 3. This construction provides a rigid interlock between all of the baffle elements and between them and the lining of the furnace to form the rigid baffle means 26 which cannot shift in the furnace. The same construction, of course, is employed in the first baffle means 25.

The length and shape of the baffle elements 31, 32, 33, 34, and 35 are important. As shown in FIG. 3, the length of each baffle element is such as to leave a space between its end and the adjacent inner wall of the furnace lining 17, the two lowermost being the spaces 48 and 49, and in the embodiment shown there being five of such spaces which provide passages or channels for the passage of gas through the baffle means 26. The total cross-sectional area of such passages or channels is approximately the same as the total cross-sectional area of the holes 28 in the RH mass 22 and in the center mass 20, which is an important feature of the invention, as will be pointed out more fully hereinafter.

Figure 9:
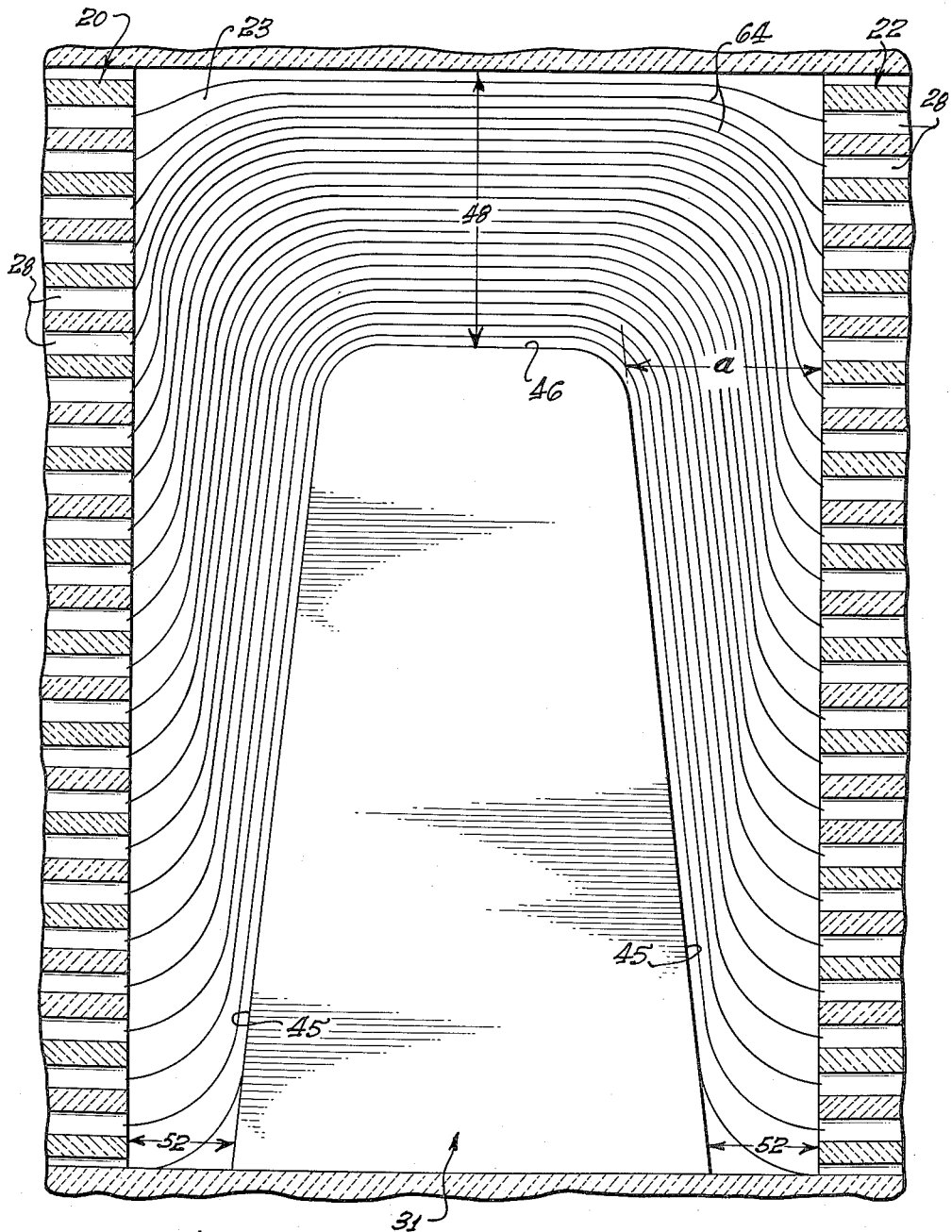
FIG. 9 is a schematic plan view of the combustion chamber illustrating a flow pattern therethrough.

As best shown in FIG. 9, the space 48 is 4½" across between the baffle element 31 and the adjacent inner wall of the combustion chamber 23. Between the tapered sides 45 of the baffle element and the adjacent faces of the RH mass 22 and the center mass 20 are tapered spaces 52 each of which is 1¾" wide at the base adjacent the side wall of the combustion chamber 3¼" wide at a point $a$ adjacent to the end of the baffle element. The baffle element 31 extends three-quarters of the way across the combustion chamber 23 and all of the gas passes through the space 48 which has a cross-sectional area 4" x 4½". The cross-sectional area of the space 52 at $a$ is 3¼" x 4" and must carry about three-quarters of the gas at this point. The ratio of the area of the space 52 at point $a$ to the area of the space 48 is therefore almost exactly 3:4, which insures the same gas velocity through both spaces at these points, and due to the taper of the spaces 52 the gas velocity will be substantially constant throughout the combustion chamber. The gas velocity in the combustion chamber will also be substantially equal to the velocity of gas issuing from the holes 28 into the combustion chamber from either of the masses 20 or 22. This uniformity of gas velocity is a further object of the invention. Due to the rigid interlock of the baffle elements with each other and with the sides of the furnace, the cross-sectional areas of the spaces around and through the baffle elements cannot vary and uniform gas velocities are maintained throughout the operation of the furnace.

As best shown in FIGS. 1 and 3, extending into the combustion chamber 23 is a fuel injection means 53 which consists of three fuel injection nozzles 54 extending through the side 13 of the furnace and two similar fuel injection nozzles 55 extending through the side 14. The outer ends of these nozzles are connected to a suitable source of fuel (not shown). A similar fuel injection means 56 extends into the other combustion chamber 21. Each of the fuel injection means 53 and 56 is adapted to deliver a fuel, such as, for example, natural gas or off-gas from the process, at a high velocity and preferably at about its critical velocity which is the velocity of sound in the gas employed, and the fuel injection nozzles and the source of fuel supply are so designed. This is another object of the invention, and will be discussed further hereinafter. As will be noted, the fuel injection means 53 is disposed between the baffle means 26 and the RH mass 22, and the fuel injection means 56 is located between the baffle means 25 and the LH mass 19, which is a further feature of the invention.

As best shown in FIGS. 1, 7, and 8, control orifice means 58 is provided in the RH mass adjacent to the combustion chamber 23. A similar control orifice means 59 is provided midway between the ends of the center mass 20, and a similar control orifice means 60 is provided in the LH mass 19. Such control orifice means are located at three points so that each ceramic mass has its own control. The control orifice means 58 consists of a plurality of tubular flow beans 61 each preferably formed of ceramic material and each being disposed in one of the holes 28 of the ceramic mass. The flow beans 61 are preferably formed independently and secured in their respective holes 28 by cementing or otherwise during assembly of the furnace. Each flow bean 61 has a control orifice 62. In selecting the size of the control orifice 62, I have found that it is desirable to have the pressure drop through the orifice greater than the total pressure drop through its respective hole 28 without any flow bean therein. Other features of the control orifice means 58, 59, and 60, and their operation, will be described hereinafter.

As will be understood by those skilled in the art, and as shown in said Hasche et al. Patent No. 2,692,819, the outer end of each of the ceramic masses 19 and 22 is adapted to be connected alternatively with a source of air, a source of in-gas, or a stack or other point of discharge, and fuel may alternatively be supplied to either of the fuel injection means 53 and 56.

In starting the operation of the apparatus described herein, it is normally necessary to pre-heat the masses 19, 20, and 22. This may be accomplished by injecting air into the outer end of the RH mass 22 and therethrough and at the same time injecting fuel into the combustion space 23 in which they mix and are combusted, the hot products of combustion passing from right to left through the center mass 20, the combustion chamber 21, and the LH mass 19, from which they are conveyed to the stack and discharged, heating the masses 20 and 19. The step is then reversed, to pass air from the left-hand end of the LH mass 19 therethrough and into the combustion chamber 21 where it is mixed with fuel injected through the fuel injection means 56 and combusted, the hot products of combustion passing from left-to-right through the center mass 20, the combustion chamber 23, and the RH mass 22, from which they are discharged to the stack. These steps may be repeated until the masses 19, 20, and 22 are brought up to their desired temperatures.

When acetylene is to be produced in a furnace of the character described, and it is intended to commence the cycle operation of the furnace with a right-hand make step, the center mass 20 and the inner end of the LH mass 19 will be preheated to a temperature at which pyrolysis of an in-gas can occur in passing therethrough to form acetylene, and the bulk of the RH mass will be at a temperature sufficiently lower to quench the cracked gas as to stabilize the acetylene. The first make step may then be performed.

In the first make step, an in-gas is conveyed from left-to-right through the LH mass 19, the combustion chamber 21, and through the center mass 20, to form a cracked gas containing the desired hydrocarbon. Such cracked gas is then conveyed through the combustion chamber 23 and the RH mass 22 and during its passage through the latter is quenched to a temperature at which the desired hydrocarbon is stable, the quenched cracked gas passing from the right-hand end of the RH mass to storage, purification, or use.

The first make step if from left-to-right is followed by a first heat step, also from left-to-right, in which air is introduced into the left-hand end of the LH mass 19 and passed therethrough and into the combustion chamber 21 in which it is mixed with fuel supplied thereto through the fuel injection means 56 and combusted therein, the hot products of combustion flowing from left-to-right as previously described to heat the center and RH masses 20 and 22. In this step, air introduced into the left-hand end of the LH mass 19 is normally at or about atmospheric temperature, and during its passage through the mass it cools the mass to reduce the temperature gradient across the mass to permit the mass to serve as a quench for cracked gas on the next subsequent right-to-left make step, which will be described hereinafter. Also, since the LH mass 19 is normally quite hot when the first left-to-right heat step is initiated, the air passing therethrough will be preheated to a temperature substantially above the ignition temperature of the mixture of fuel and air in the combustion chamber 21 so that when such mixture is formed in the combustion chamber 21 combustion of the mixture will take place. Thus, in this first heat step the temperature of the LH mass 19 is reduced to a desired quenching temperature and the air passing therethrough is preheated.

The next step is a make step from right-to-left, an in-gas being supplied to the right-hand end of the RH mass 22 and passing therethrough, through the combustion chamber 23 and through the center mass 20 to form a cracked gas containing the desired hydrocarbon, the cracked gas being quenched as described above by passage through the combustion chamber 21 and through the LH mass 19.

The second make step is followed by a second heat step, also from right-to-left, in which air is passed through the RH mass 22 and is mixed with fuel in the combustion chamber 23 in which combustion takes place to form hot products of combustion which are passed through the center mass 20, the combustion chamber 21, and the LH mass 19 to the stack, again heating the center and RH masses. During its passage through the LH mass 19, the cracked gas gives up most of its heat to the mass, which serves to quench the cracked gas and to reheat the LH mass preparatory to the next heat step.

The foregoing cycle of heat and make steps may then be continued indefinitely, or the sequence may be altered as desired.

Considering first the operation of the LH mass 19, during a left-to-right heat step in which air is passed through the LH mass, each passage 28 therein is capable of preheating about 0.7 cubic foot per minute of air. During a right-to-left heating step, each passage 28 is capable of quenching about the same amount of products of combustion passing therethrough. In a left-to-right make step, each passage 28 of the LH mass 19 will handle a feed of about 0.01 pound of in-gas per minute diluted with about 0.03 pound of steam per minute used as a diluent, and partially cracks this mixture to produce approximately 0.25 cubic foot per minute of cracked gas as measured after the steam content is condensed therefrom. Of this 0.25 cubic foot per minute, approximately 0.05 cubic foot per minute is $C_2H_4$ and about 0.012 cubic foot per minute is $C_2H_2$, the balance being largely hydrogen, methane, CO, $CO_2$, and minor constituents. During a right-to-left make step, each passage 28 of the LH mass 19 quenches approximately one cubic foot per minute of the steam and cracked gas mixture. When the make step is right-to-left, the LH mass 19 serves as a quench mass in which the mixture of cracked gas and steam is cooled to a temperature at which the rate of degradation of the acetylene or other desired hydrocarbon content of the cracked gas is low. The heat transfer rate in the LH mass 19, to accomplish this, is very high. It is found that this rate of quench runs as high as 20,000° per second. The time required for the cracked gas to pass through the LH mass 19, when operating at normal throughput is on the order of 0.04 second. The RH mass 22 operates in the same manner but with the flow directions reversed, as will be understood.

The center mass 20 is the reaction mass in which the main conversion to the desired hydrocarbon takes place, its function being to convert the gases formed in the LH mass 19 during a left-to-right make step to the desired product. When the desired hydrocarbon is $C_2H_2$, during a make step each passage 28 of the center mass 20 adds sufficient heat at the correct temperature and for the proper length of time to effectively convert about 75% of the ethylene formed in either the LH or RH mass 19 and 22 to $C_2H_2$, so that each passage produces about 0.05 cubic foot per minute net gain of acetylene, and the cracked gas will also contain the remaining 25% of the $C_2H_4$ or about 0.012 cubic foot per minute. During either heat step, the only function of the center mass 20 is to receive and store heat for a subsequent make step.

The manner in which air and fuel are introduced and mixed in the combustion chambers 21 and 23 and the operation of the baffle means 25 and 26 therein is of particular importance. Since the combustion chambers operate in identical manners, only the combustion in the chamber 23 during a right-to-left heat step will be described. As indicated, the RH mass 22 is hot and air is introduced through the passages 28 thereof into the combustion chamber 23, thus preheating the air so that it passes into the combustion chamber at a temperature of about 1000° C., at a volume of about 0.7 cubic foot per minute per passage 28. Fuel is introduced into the combustion chamber 23 through the fuel injection means 53. Any suitable and available gas or vaporized liquid fuel may be used as such fuel, but the usual practice is to employ off-gas from the process after acetylene and other desired hydrocarbons have been removed from the cracked gas. If such off-gas is used, it will normally have a heat value of approximately 475 B.t.u. per cubic foot, which will require about five volumes of air per volume of fuel for complete combustion, which is desirable. In order to obtain adequate mixing of the fuel gas with the air, the fuel is preferably delivered to the combustion chamber 23 through the fuel injection means 53 at or near critical velocity, i.e., at about the velocity of sound. Such injection velocity of the fuel will be at least ten times the velocity of air entering the combustion chamber from the RH mass 22, which promotes thorough mixing, but, as the fuel enters the chamber it will be mixed with air and rapidly lose its high velocity. Therefore, the cross-sectional area of the space 52 between the baffle element 31 at its base and the face of the mass 22 is greater than that required to carry merely the air issuing from the last row of holes 28, and is such that the velocity of the mixture of air and fuel therethrough will be higher than the mean velocity at this point so as to obtain rapid and complete mixing of the fuel and air. Since the air will be preheated to approximately 1000° C. as it leaves the ceramic mass 22 and the fuel gas injected into the combustion chamber 23 is normally at approximately room temperature, the air will have a much lower density than the fuel gas, and for this reason it is desirable to have a higher velocity in the fuel gas than in the mixture close to the wall of the combustion chamber than would be required if the air and gas were at the same temperature.

From the foregoing it will be understood that the velocity of the mixture of air and fuel through the combustion chamber 23 during the heat step is about four times as high as it would be if no baffle element 31 were in the chamber, and that the mean length of the path of the gases flowing therethrough is at least three times as long as it would be without the baffle element. This high velocity and long path through the combustion chamber 23 are important to satisfactory mixing of the fuel and air so that when the flame from the combustion thereof impinges on the face of the center mass 20 the temperature of the gases will be substantially uniform and the rate of heat transfer therefrom to the surfaces of the holes 28 in the center mass will be substantially constant. This is another important feature of the invention.

In FIG. 9 the lines 64 show schematically the paths of gas issuing from the holes 28 of the RH mass 22, around the baffle element 31 and into the center mass 20 during a right-to-left heat step. The same theoretical course would be taken by products of combustion leaving the center mass 20, passing around the baffle element 31, and entering the RH mass 22 during a left-to-right heat step. As will be understood, gases passing through the combustion chamber 21 would have similar paths, but reversed in direction. As will be understood, since the air and fuel mix with some turbulence in the chamber 23, the paths indicated by the lines 64 are only illustrative. However, the velocities of such gases in the two combustion chambers 21 and 23 will not be equal during either the heat or make steps. On a right-to-left heat step the temperature of the products of combustion will be higher in the combustion chamber 23 than in the chamber 21, and therefore the velocity of such products of combustion will be higher in the chamber 23 than in the chamber 21. Conversely, on a left-to-right heat step, the velocity of the products of combustion will be higher in the chamber 21 than in the chamber 23. During the make steps, however, the reverse is true, both because heat is being transferred to the gas from the central mass 20 and because of the cracking, which results in an expansion of the cracked gas, so that in a right-to-left make step the volume of gas passing through the combustion chamber 21 will be higher than that passing through the chamber 23 and the velocity will be higher in the chamber 21 than in the chamber 23.

Another important advantage of the baffle elements 25 and 26 is that they reduce the residence time of the gas in their respective combustion chambers during the make steps, it being highly desirable to maintain such residence time to a minimum to produce optimum yields, particularly when acetylene is the desired hydrocarbon. By the use of the baffle elements 25 and 26, about 75% of the volume of their respective combustion chambers is occupied by the baffle elements, and therefore the residence time of the cracked gas in the combustion chambers is reduced by a factor of four. For example, if the combustion chamber 23 is 11½" long, the gas residence time in it would be equal to that in 46" of a ceramic mass similar to the RH mass 22, and the total residence time in the two combustion chambers 21 and 23 would be equal to that in a ceramic mass approximately 92" long. By employing the baffle elements 25 and 26, the total residence time of the cracked gas in the two combustion chambers 21 and 23 is reduced to the equivalent of that in 23" of such a ceramic mass or exactly the combined length of the two combustion chambers 21 and 23.

I have found that the length of each of the masses 19 and 22 should be selected so that upon both make steps the exit temperature of the cracked gas issuing from either mass will be maintained above the dew point of any tar vapor carried in the cracked gas. If such exit temperature falls below such dew point, tars may condense on the walls of the holes 28, which is very undesirable. In the preferred embodiment disclosed herein, the LH mass 19 and the RH mass 22 each has a length of 81", which is approximately correct to accomplish this result. Using propane, or a mixture of propane and steam as the in-gas, and with a LH mass of this length, during a left-to-right make step the cracked gas leaving the inner end of the LH mass and entering the combustion chamber 21, when the temperature gradient across the furnace is selected for optimum acetylene production, will have a composition as follows:

*Table I*

| | | | |
|---|---|---|---|
| CO | 3.3 | $C_3H_4$ | .5 |
| $N_2$ | .8 | $C_3H_6$ | 1.0 |
| $H_2$ | 40.1 | $C_3H_8$ | .6 |
| $CH_4$ | 23.3 | $C_4H_4$ | .2 |
| $C_2H_2$ | 10.0 | $C_4H_6$ | .2 |
| $C_2H_4$ | 19.1 | $C_6H_6$ | .2 |
| $C_2H_6$ | .8 | $CO_2$ | .8 |

From Table I, above, a comparison of the ingas and the cracked gas indicates that substantially all of the in-gas is reacted in the LH mass 19 and that ethylene is the predominant olefin in the cracked gas at this point during the make step. With normal rate of flow, the residence time of such cracked gas in the combustion chamber 21 is only about 0.015 second, and with a low heat absorption due to the fact that the surface area of the combustion chamber is relatively small, there is little change in gas composition as it passes through the combustion chamber, and this is a further feature of the invention.

For a furnace as described, I have found that the preferred length of the center mass 20 is 20.5". In using such a center mass 20, and with the process described, the cracked gas shown in Table I passes from the combustion chamber 21, through the holes 28 of the center mass, and into the combustion chamber 23. The cracked gas leaving the center mass 20 and passing into the combustion chamber 23 will have a composition substantially as follows:

Table II

| | | | |
|---|---|---|---|
| CO | 7. | $C_3H_4$ | .4 |
| $H_2$ | 49.3 | $C_3H_6$ | .1 |
| $CH_4$ | 18.6 | $C_4H_2$ | .2 |
| $C_2H_2$ | 16.2 | $C_4H_4$ | .2 |
| $C_2H_4$ | 5.6 | $C_6H_6$ | .6 |
| $C_2H_6$ | .1 | $CO_2$ | 1.6 |

The cracked gas having the composition shown in Table II passes through the combustion chamber 23 and passes through the relatively cool RH mass 22 in which the cracked gas is quenched by heat transfer to this mass. The rate of heat transfer from the cracked gas to the RH mass 22 is very high, being in the order of 20,000° C. per second. This has been found sufficient to stop acetylene degradation satisfactorily and therefore the composition of the cracked gas in the stream leaving the right-hand end of the RH mass 22 will be substantially the same as that given above in Table II.

In determining the proportions of the regenerative masses 19, 20, and 22 best suited to carry out this invention it is important to divide the input of heat to the in-gas and partially cracked gas so that the production of acetylene is largely confined to the center mass 20. The results set forth in Tables I and II above show that this is the case. In a left-to-right make step, an analysis of gas samples taken only a few inches back in the LH mass 19 from the combustion chamber 21 show a very low acetylene content and a maximum ethylene content of about 30%.

The ceramic masses 19, 20, and 22 are designed to provide an optimum heat balance during the operation of the process. With conditions as described above, tests have demonstrated that during a left-to-right make step to produce acetylene the reaction heat required from the LH mass 19 is about 2335 B.t.u. per minute to produce an optimum yield of acetylene and the sensible heat required therefrom to heat the in-gas to about 975° C. is about 3468 B.t.u. per minute, making a total of 5803 B.t.u. per minute of required heat. This amount of heat is supplied by a reduction in temperature of the LH mass 19. In the preferred furnace disclosed, the LH mass 19 weighs about 1120 pounds and is formed of alundum, and the means specific heat of alundum is 0.31. The heat capacity of the LH mass 19 therefore is 345 B.t.u. per degree Fahrenheit or 620 B.t.u. per degree centigrade. To deliver the 5803 B.t.u. required, as pointed out above, the mean temperature change of the LH mass 19 during such make step would, therefore, be about 9.4° C.

In the center mass 20, with conditions as described in the preceding paragraph, the reaction heat required is about 1130 B.t.u. per minute and the sensible heat required to raise the temperature of the partially cracked gas from 975° C. to 1075° C., an optimum temperature for producing acetylene in the center mass, is about 412 B.t.u. per minute, making a total of 1542 B.t.u. per minute. The center mass 20 weighs about 279 pounds, which would provide a heat capacity of about 86 B.t.u. per degree F., or 156 B.t.u. per degree C. Therefore, to supply the heat required in the center mass 20 the mean temperature change thereof would be about 9.9° C. This is substantially the same temperature change as required in the LH mass 19, and this is a further feature of the invention. As will be understood, the heat balance between the RH mass 23 and the center mass 20 during a right-to-left make step will be the same.

Although Table I, above, shows that the cracked gas leaving the LH mass 19 during a make step contains 10% acetylene, still measurements taken of the composition of the gas only about four inches back in the LH mass from the combustion space 21 show that at this point the gas contains only about 1% of acetylene. Since only a very small part of the reaction heat stored in the LH mass and transferred to the in-gas therein is transferred to the in-gas during its passage through these last four inches of its travel through the LH mass, it will be apparent that where acetylene is the desired end product substantially all of the reaction heat utilized in forming acetylene is supplied by the center mass 20. This is an important feature of the invention.

The control orifice means 58, 59, and 60 have two separate but related functions. First, they assist in maintaining a substantially uniform flow of hot combustion products through all of the passages 28 to provide uniform heating of the masses throughout their cross-sectional areas during the heat steps. This insures uniform heating of the gases during the make steps and promotes more uniform cracking and quenching in all of the passages 28 in any particular mass. Secondly, during the make steps they provide a substantially uniform residence time of the gas in all of the passages 28 of any particular mass to promote uniform cracking or quenching in such mass.

To provide uniform flow through all of the passages 28 of each of the masses 19, 20, and 22 it is important that the velocity of approach and the angle of approach should be the same in all passages of a particular mass. Considering only the LH mass 19, the total pressure drop of gas pasing therethrough in the absence of the control orifice means 60 and at normal flow rates is about 3.0" of water static pressure, or about 0.2" of mercury. Under such conditions, the gas velocity in the passages 28 is about 202 feet per second; the total velocity head in the passages is 635 feet; and the total pressure drop in the passages is 1870 feet. Based upon the mean density of the mixture of steam and cracked gas at the operating temperatures and pressure in the passages, the velocity head and pressure drop given above would correspond to 0.6" of water and 1.75" of water respectively. Normally one velocity head loss would be experienced at the entrance to this mass and one velocity head at the exit, and therefore the total friction drop through the mass would be 2.95" of water. Any variation in such velocity head or friction loss in any particular passage would result in a corresponding change in the gas flow through the passage and, consequently, would result in a change in the heat transfer and residence time of the gas in the passage. This, in turn, would result in a variation in the amount of cracking obtained in the passage. Such variations may vary widely between the various passages of such a ceramic mass if no control means is provided for the flow of gas through the passages. To avoid such variations, the control orifice means 58, 59, and 60 are provided, which respectively meter the gas flowing through all of the passages 28 in each respective ceramic mass.

The location of the control orifice means 58 and 60 in their respective masses 22 and 19 is important, each of the same being located at a point in its mass where the temperature is always above the ignition temperature of any carbon or tar produced in the process. Thus, if any carbon or tar is deposited on the walls of the control orifices 62 during a make step, it will be burned off during a subsequent heat step. For example, if any of the orifices 62 of the control orifice means 60 have a carbon or tar deposit on the walls thereof from a prior make step, on a subsequent left-to-right heat step air is passed through the LH mass 19 and when it reaches the control orifice means 60 the temperature of the deposit will be its ignition temperature and the deposit will burn off. The ignition temperature of such a deposit varies between 350° C. and 700° C., depending upon the amount of vaporizable material in the deposit. Therefore, no carbon or tar deposit can build up in the orifices, which is important in keeping them open for their control function. The orifices 62 of the control orifice means 59 and 58 are not exposed to air during such a left-to-right heat step except to the extent that excess air is supplied for combustion during such heat step and this may be insufficient to burn off any deposit thereon during that heat step. However, the control orifice means 58 is exposed to air on the next right-to-left heat step and any such deposit thereon is burned off at that time.

Normally, there is little if any deposit of tar or carbon in the center mass 20. However, to insure complete burning of any such deposit therein and in the outer masses 19 and 23, I prefer to select the quantities of air and fuel for each heat step so that the desired temperature in the center mass 20 is reached ten to fifteen seconds before the end of each heat step. The supply of fuel is then shut off and the flow of air is continued to insure complete burning of any deposits of tar or carbon in the furnace. I have found that exposure to air at the elevated temperatures prevailing in the furnace for even 5% of a heat step is ample to burn off any such deposit formed, although a longer air flow may be permitted for safety.

The control orifices 62 are normally all of the same diameter, but may be varied if desired. Maintaining uniform velocity of gas through the passages 28 is of the greatest importance in the center mass 20 in which the final cracking is done, and, therefore, if there is any difference in the diameters of the orifices 62 as between the various masses, those in the center mass should have the smallest diameter. In determining the diameter of the control orifices 62 I have found that it is desirable to have the pressure drop through an orifice greater than the normal pressure drop through its passage 28 without the orifice. As pointed out above, the total pressure drop in each of the openings 28 of the center mass 20 at normal rates of flow when producing acetylene is about 0.13" of mercury. Due to the necessary manufacturing tolerances, this pressure drop can vary as much as 25%. I have found that the diameter of a control orifice 62 should be about 50% to 75% of the diameter of its associated passage 28, in which case the pressure drop through the orifice will be 0.21" of mercury to 0.70" of mercury, respectively. If the passage 28 has a diameter of about 0.375", as is usual, the preferred diameter of the orifice 62 is 0.20" which provides a pressure drop through the orifice of 0.45" of mercury. It will thus be understood that a variation of 25% in the fluid friction in a passage 28 would correspond to a total pressure drop of 0.033" of mercury, and with the orifice 62 0.20" in diameter, the normal pressure drop would be 0.58" of mercury. Therefore, the change in flow for a 25% variation in fluid friction in the passage 28 would be in the ratio of 0.033:0.58, or approximately 5%. This is sufficiently close control to provide substantially uniform cracking in all of the passages 28 of each ceramic mass.

The examples given above for the operation of the invention to produce acetylene are illustrative of the application of such a three-mass furnace having controlled temperature distribution and controlled flow distribution. The same factors apply to the production of other gases by my apparatus and process, and particularly to such gases having a high endothermic heat. Thus, I have found that the invention will also provide high yields of ethylene, if desired. To produce high yields of ethylene, it is only necessary to lower the temperature in the center mass 20 to about 875° C. The heat requirements are thus materially reduced, and I have found that the capacity of the furnace is increased by a factor of three as compared to its capacity for optimum production of acetylene.

Although I have shown and described a preferred embodiment of the process and apparatus of my invention, it will be apparent that the invention is applicable to furnaces of other sizes and designs, and I therefore desire to be afforded the full scope of the following claims.

I claim as my invention:

1. In a regenerative furnace for the pyrolysis of hydrocarbons, the combination of:
   a first regenerative mass;
   a second regenerative mass spaced from said first mass to provide an open space therebetween, each of said masses having longitudinal passages, therethrough communicating with said space and adapted to carry the flow of gases; and
   baffle means in said space, said baffle means including a longitudinally tapered element the axis of which is perpendicular to the axis of said masses, the base of said element being flush with one side wall of said combustion space and the tapered end of said element being spaced from the opposite side wall of the combustion space, the taper of said element and its said spacing from said opposite side wall being such that gases flowing along said element and around the tapered end thereof flow at substantially uniform velocity.

2. In a regenerative furnace for the pyrolytic decomposition of hydrocarbons, the combination of:
   first and second regenerative masses spaced apart to provide a space therebetween, each of said masses having a plurality of longitudinal passages therethrough;
   means for heating said first mass to provide a temperature gradient therein downwardly from its end adjacent to said space to the other end thereof; and
   flow metering means in all of the passages of the first mass to equalize the velocity of gas flowing through the passages thereof, said flow metering means being located in said first mass at a point where the temperature thereof is above the ignition temperature of carbonaceous material deposited on said metering means as a result of the decomposition of hydrocarbons in said first mass.

3. In a regenerative furnace for the pyrolytic decomposition of hydrocarbons, the combination of:
   a LH regenerative mass;
   a center regenerative mass spaced from said LH mass to provide a first space therebetween;
   a RH regenerative mass spaced from said center mass to provide a second space therebetween, each of said masses having a plurality of longitudinal passages therethrough;
   first flow metering means in the passages of said LH mass to equalize the velocity of gas flowing through the passages thereof; and
   second flow metering means in the passages of the RH mass to equalize the velocity of gas flowing through the passages thereof, each of said flow metering means being located in its mass at a point adjacent to the space adjacent to that mass.

4. In a regenerative furnace for the pyrolytic decomposition of hydrocarbons, the combination of:
   a LH regenerative mass;
   a center regenerative mass spaced from said LH mass to provide a first space therebetween;

a RH regenerative mass spaced from said center mass to provide a second space therebetween, each of said masses having a plurality of longitudinal passages therethrough;
first flow metering means in the passages of said LH mass to equalize the velocity of gas flowing through the passages thereof;
second flow metering means in the passages of the RH mass to equalize the velocity of gas flowing through the passages thereof, each of said flow metering means being located in its mass at a point adjacent to the space adjacent to that mass; and
a third flow metering means in the passages of said center mass substantially midway between the ends thereof.

5. In a regenerative furnace for the pyrolytic decomposition of hydrocarbons, the combination of:
a LH regenerative mass;
a center regenerative mass spaced from said LH mass to provide a first space therebetween;
a RH regenerative mass spaced from said center mass to provide a second space therebetween, each of said masses having a plurality of longitudinal passages therethrough;
first flow metering means in the passages of said LH mass to equalize the velocity of gas flowing through the passages thereof;
second flow metering means in the passages of the RH mass to equalize the velocity of gas flowing through the passages thereof, each of said flow metering means being located in its mass at a point adjacent to the space adjacent to that mass; and
a third flow metering means in the passages of said center mass substantially midway between the ends thereof, the fluid pressure drop through said third flow metering means being no less than the fluid pressure drop through either said first or second flow metering means.

6. In a regenerative furnace for the pyrolysis of hydrocarbons, the combination of:
a first regenerative mass;
a second regenerative mass spaced from said first mass to provide an open space therebetween, each of said masses having longitudinal passages therethrough communicating with said space and adapted to carry the flow of gases; and
baffle means in said space, including a plurality of tapered baffle elements stacked one on top of another with their longitudinal axes perpendicular to the axis of the furnace, each of said baffle elements having a length less than the width of said space, each of said elements having a base flush with a side wall of said combutsion space and the tapered end of said element being spaced from an opposite side wall of the combustion space, said elements being alternately stacked vertically so that the bases of adjacent elements are flush with opposite walls of said space.

7. A furnace as defined in claim 6 above, in which said baffle elements have interlocking means for maintaining said elements in their stacked positions relative to each other and relative to the walls of the combustion space.

References Cited in the file of this patent

UNITED STATES PATENTS

| | | |
|---|---|---|
| 2,197,674 | Angle | Apr. 16, 1940 |
| 2,692,819 | Hasche et al. | Oct. 26, 1954 |
| 2,785,212 | Begley | Mar. 12, 1957 |